United States Patent
Ziegler

(10) Patent No.: US 7,378,921 B2
(45) Date of Patent: May 27, 2008

(54) COUPLING ARRANGEMENT FOR RF-BASED DIFFERENTIAL SIGNAL TRANSMISSION

(75) Inventor: Rainer Ziegler, Stuttgart (DE)

(73) Assignee: Evolium S.A.S., Paris (FR)

( * ) Notice: Subject to any disclaimer, the term of this patent is extended or adjusted under 35 U.S.C. 154(b) by 234 days.

(21) Appl. No.: 11/174,625

(22) Filed: Jul. 6, 2005

(65) Prior Publication Data
US 2006/0006958 A1   Jan. 12, 2006

(30) Foreign Application Priority Data
Jul. 8, 2004   (EP)   ................... 04360063

(51) Int. Cl.
*H01P 5/12* (2006.01)
*H03C 3/06* (2006.01)

(52) U.S. Cl. .................... 333/100; 333/24 R
(58) Field of Classification Search ........... 333/100, 333/24 R; 330/149; 375/224, 297; 455/115.2
See application file for complete search history.

(56) References Cited
U.S. PATENT DOCUMENTS
3,906,401 A    9/1975 Seidel

| 5,093,637 A | 3/1992 | Suematsu et al. |
| 5,995,541 A | 11/1999 | Navid et al. |
| 2002/0115416 A1 | 8/2002 | Riou et al. |
| 2002/0168023 A1 | 11/2002 | Hentati et al. |

*Primary Examiner*—Dean Takaoka
(74) *Attorney, Agent, or Firm*—Sughrue Mion, PLLC

(57) ABSTRACT

The present invention provides a coupling arrangement for coupling out a RF signal of a transmission line connecting a first and a second RF unit, such like an IQ modulator and a power amplifier. The coupling arrangement comprises first and second coupling means that are adapted to be coupled to respective first and second transmission lines connecting the RF units. The first and second transmission lines separately provide transmission of respective first and second RF signals forming a differential RF signal. Preferably, the first coupling means are adapted to provide coupling out of the first RF signal, thereby inevitably affecting transmission of the first RF signal. The second coupling means provide a substantially equal impact on the transmission of the second RF signal, such that the net impact of first and second coupling means on the differential RF signal nearly vanishes. Hence, an impact of the first coupling means on the transmission of the first RF signal may be completely compensated by means of the impact of the second coupling means on the transmission of the second RF signal.

8 Claims, 2 Drawing Sheets

COUPLING ARRANGEMENT FOR RF-BASED DIFFERENTIAL SIGNAL TRANSMISSION

BACKGROUND OF THE INVENTION

The invention is based on a priority application EP 04 360 063.4 which is hereby incorporated by reference.

The present invention relates to the field of coupling of radio frequency (RF) signals.

In the framework of telecommunication systems providing RF based wireless signal transmission, a plurality of signal modulation techniques is widely applied. Typically, signal modulation and signal amplification is realized by two separate components of an RF circuit. Therefore, a modulated RF signal generated by an RF modulator has to be transmitted to an amplifier for providing sufficient amplification for signal broadcasting.

For transmission of RF signals between any two units of a RF circuit, differential signal transmission provides an effective means for reducing noise level and to reject common-mode voltages. Differential signal transmission is typically realized by means of two separate transmission lines for separately transmitting of two, typically phase shifted, radio frequency (RF) signals forming the differential signal. Differential signal transmission is preferably applicable in combination with two-phase modulation techniques, such as In-Phase Quadrature (IQ), Quadrature Phase-Shift Keying (QPSK), Binary Phase-Shift Keying (BPSK), Differential Phase-Shift Keying (DPSK), Quadrature Amplitude Modulation (QAM) and Pulse Code Modulation (PCM).

For many applications a modulated RF signal has to be measured in order to determine the quality of the modulation and to detect potential signal distortions that may arise due to improperly tuned modulation parameters. Therefore, at least a part of a generated modulated RF signal has to be coupled to a corresponding detector. Coupling of the modulated RF signal, i.e. deriving of at least a part of the RF signal and providing the derived part to a detector, has to meet stringent requirements in order to prevent signal distortion. Typically, coupling of a differential RF signal refers to coupling to anyone of the two separate RF signals. Hence, coupling is applied to one of the two separate transmission lines connecting two RF units, that may be implemented as e.g. a modulator and a power amplifier.

In general, coupling of an RF signal can be effectively realized by parallel arrangement of an additional transmission line located at a specific distance from the main transmission line connecting the two RF units. Typically, this distance is specified by the wavelength of the RF signals and equals to $\lambda/4$. Even for the RF bands operating in the GHz range, this distance may be as large as several cm. This requires a rather spacious implementation of a coupling mechanism and does not allow a compact and cost-efficient design of a coupling arrangement.

Alternative coupling arrangements might be implemented by making use of directly connecting electronic components like resistors and capacitors to the RF transmission line. However, this type of coupling arrangements may have a serious impact on the transmission of the radio frequency signal provided by the respective transmission line.

The present invention therefore aims to provide a space-saving coupling arrangement for differential transmission lines featuring a minimal impact on the transmission of the differential RF signal.

SUMMARY OF THE INVENTION

The present invention provides a coupling arrangement for coupling out a signal of a first transmission line connecting a first and a second radio frequency unit. The first radio frequency unit is connected to the second radio frequency unit by means of a first and a second transmission line. The first transmission line provides transmission of a first radio frequency signal and the second transmission line provides transmission of a second radio frequency signal. The inventive coupling arrangement comprises first and second coupling means. The first coupling means are adapted to be coupled to the first transmission line for coupling out the signal of the first transmission line. The first coupling means have first electrical properties having a first impact on the transmission of the first signal that is transmitted by means of the first transmission line.

The second coupling means are adapted to be coupled to the second transmission line. The second coupling means have second electrical properties that are substantially equal to the first electrical properties of the first coupling means. Consequently, the second coupling means have a second impact on the transmission of the second signal that is transmitted by the second transmission line.

In this way, the inventive coupling arrangement is implemented as a symmetric coupling arrangement. The first coupling means effectively provide coupling out of the first signal, whereas the second coupling means do not have to provide an effective coupling. Moreover, the second coupling means provide substantially equal electrical, i.e. high frequency (HF), properties compared to the electrical properties of the first coupling means. In this way, non-negligible and unavoidable impact of the first coupling means on the transmission of the first RF signal is also applied to the second RF signal that is transmitted by means of the second RF transmission line connecting the first and the second RF unit. Hence, transmission of the first and second signals is equally affected by the respective first and second coupling means.

Coupling out of the signal of the first transmission line refers to a coupling out of a part of the first RF signal that is transmitted by the first transmission line. Preferably, this coupled out part represents only a minor part of the first RF signal that might be sufficient for performing a measurement on the first RF signal. Hence, a major part of the first RF signal remains in the first transmission line and is therefore transmitted from the first to the second RF unit.

According to a further preferred embodiment of the invention, the first and the second radio frequency signals form a differential signal, that is transmitted between the first and the second radio frequency unit. Hence, the differential RF signal representing data being transmitted between the first and the second RF unit, is decomposed into first and second RF signals, that are separately transmitted by means of two separate RF transmission lines. For example, the first and the second RF signal might be phase shifted by $\pi$ which allows to reduce the noise level and to reject common-mode voltages of the RF signals. Also, the second RF signal may represent an inverted first RF signal. Data that is transmitted by means of the differential signal can be effectively retrieved by mutually subtracting the first and the second RF signals being separately transmitted by means of the first and second transmission lines. Since first and second coupling means induce identical distortion to respective first and second RF signals, the retrieved data remains substantially unaffected when a respective subtraction operation is performed.

By virtue of the differential signal transmission provided by the first and second transmission lines, equal impacts on the first and the second RF signals mutually compensate. In this way, the invention provides a minimal invasive coupling arrangement for deriving a part of a transmitted RF signal. Hence, the second coupling means effectively provide compensation of the first coupling means' impact on the transmission of the first RF signal.

According to a further preferred embodiment of the invention, the first coupling means comprise a first electrical capacity and a first electrical resistance. Typically, by means of a capacitor, a coupling to the first transmission line can be effectively realized. The second coupling means preferably comprise electrical, i.e. high frequency, properties that are substantially equal to the electrical properties of the first coupling means being specified by the first electrical capacity and the first electrical resistance. Therefore, the second coupling means may comprise second electrical capacitors and resistors that are identical to the first electrical capacitive and resistive elements. In general, as long as the overall impact of the second coupling means to the transmission of the second RF signal are substantially equal to the impact of the first coupling means on the first RF signals' transmission, the second coupling means may comprise a different assembly and different electrical components clearly deviating from assembly and composition of the first coupling means.

In particular, by making use of resistive and capacitive electrical components for coupling out of the first RF signal of the first transmission line, the respective first coupling means can be realized in a cost-efficient and space-saving way. These electrical components may feature dimensions in a mm- or even sub-mm range, whereas RF coupling techniques of the prior art may require placing of a parallel transmission line in a distance of $\lambda/4$ from the first transmission line. In the prior art even for applications in the GHz range, this distance may well exceed a few cm. The inventive coupling arrangement therefore provides a cost-efficient as well as space-saving approach for a RF-signal coupling.

According to a further preferred embodiment of the invention, the first coupling means further comprise a signal processing element for processing of the signal being coupled out of the first transmission line. In this way, the first coupling means incorporate signal processing of the coupled RF signal. Signal processing may refer to measurements related to the quality of the first RF signal. For example, signal processing measures an amplitude modulation of the first RF signal. Measuring of parameters specifying the quality of a RF signal is advantageous in order to provide feedback to a signal modulator. In this way, an efficient control mechanism can be implemented.

Furthermore, the signal processing element of the first coupling means may also have a non-negligible impact on the transmission of the first RF signal. Therefore, the second coupling means, i.e. the electrical properties of the second coupling means have to be appropriately modified in order to account for eventual changes of the first coupling means' impact on the transmission of the first RF signal.

According to a further preferred embodiment of the invention, the second coupling means further comprise a termination element. The termination element has a terminating impedance to prevent reflections of RF signals that are inevitably coupled from the second transmission line. In this way, feedback of interfering signals into the second transmission line can be effectively suppressed.

According to a further preferred embodiment of the invention, the first radio frequency unit comprises an In-Phase Quadrature (IQ) modulator and the second radio frequency unit comprises a radio frequency power amplifier. In this embodiment the inventive coupling arrangement effectively provides coupling of a modulated RF signal before it becomes subject to amplification. At least, a part of the modulated RF signal is coupled out of the transmission line to e.g. a signal processing element in order to control the modulation of the signal. Generally, the IQ modulator might be replaced by any other type of modulator providing differential output that is decomposed into first and second RF signals.

Consequently, the inventive coupling arrangement might be universally incorporated into devices that provide modulation of RF signals. For example, the inventive coupling arrangement may be implemented in combination with QPSK-, QAM-, BPSK-, DPSK-, or PCM-modulators. Also, the second RF unit does not necessarily have to be implemented as a power amplification unit. Alternatively, the second RF unit may be implemented as anyone of the above mentioned modulators. In principle, the inventive coupling arrangement can be universally incorporated into devices and arrangements making use of differential signal transmission.

According to a further preferred embodiment of the invention, the signal processing element comprises a radio frequency detector diode. In this embodiment signal processing merely refers to signal detection and subsequent signal transmission to an additional RF unit providing corresponding signal processing. Also here, the impact of the second coupling means, hence, the electrical properties of the second coupling means, have to be properly adapted to the overall impact of the first coupling means and the RF detector diode on the first signals transmission.

According to a further preferred embodiment of the invention, the signal processing element is further coupled to the first radio frequency unit. The signal processing element is adapted to measure at least one actual signal parameter of the first RF signal and is further adapted to transmit the at least one measured signal parameter to the first RF unit. The first RF unit further comprises control means for eliminating a difference between a desired and the measured actual value of the at least one signal parameter. In this way, a control loop can be effectively implemented. The first coupling means and its signal processing element serve to determine an actual signal parameter of the first signal, that might be indicative of a quality of an amplitude modulation generated by the first RF unit.

Transmitting the measured actual signal parameter to the first RF unit allows for a comparison with a desired signal parameter. In response to such a comparison, the desired parameter may be tuned in such a way, that the measured actual signal parameter corresponds to the desired signal parameter. Implementation of such a feedback loop effectively provides to eliminate differences between desired and actual values of signal parameters of the differential signal being generated by the first radio frequency unit.

In another aspect, the invention provides a base station for a wireless cellular communication network. The base station comprises a first and a second radio frequency unit, as well as a first and a second transmission line for transmitting of respective first and second components of a different signal from the first RF unit to the second RF unit. The base station further comprises first coupling means for coupling out a signal of the first transmission line. The first coupling means may inevitably have a first impact on the transmission of the first component of the RF differential signal. The base station further comprises second coupling means that are adapted to be coupled to the second transmission line and that have a second impact on the transmission of the second component of the differential RF signal. The first and the second impact of respective first and second coupling means are substantially equal. The first coupling means effectively provide coupling out the signal of the first transmission line providing transmission of the first component of the differential signal, whereas the second coupling means are adapted to compensate for the impact of the first coupling means on the transmission of the first component of the differential RF signal.

Preferably, both first and second coupling means are implemented by means of capacitive and resistive electrical components that allow for a space-saving design and construction of the base station. Solutions known in the prior art making use of an additional transmission line being arranged in a λ/4 distance from the first transmission line can be effectively substituted by means of the space-saving and cost-efficient inventive arrangement.

In still another aspect, the invention provides a method of coupling out a radio frequency signal of a first transmission line connecting a first and a second radio frequency unit. The first radio frequency unit is connected to the second radio frequency unit by means of the first and a second transmission line. The first transmission line provides transmission of a first radio frequency signal and the second transmission line provides transmission of a second radio frequency signal. The coupling out of the signal of the first transmission line comprises coupling of first coupling means to the first transmission line. In order to compensate an effect of the first coupling means on the transmission of the first signal, second coupling means being adapted to be coupled to the second transmission line.

Coupling of the first coupling means to the first transmission line provides coupling out of the radio frequency signal. The first coupling means have a first impact on the transmission of the first signal and the second coupling means have a second impact on the transmission of the second signal. The first and the second impacts are substantially equal. In this way the first and the second RF signals are influenced and manipulated in the same way by means of respective first and second coupling means. Since first and second RF signals form a differential signal that is transmitted between first and second radio frequency units, any common impact to the first and the second RF signals is inherently eliminated when the data transmitted by means of the differential RF signal is retrieved.

BRIEF DESCRIPTION OF THE DRAWINGS

In the following preferred embodiments of the invention will be described in greater detail by making reference to drawings in which.

DETAILED DESCRIPTION

Figure 1:
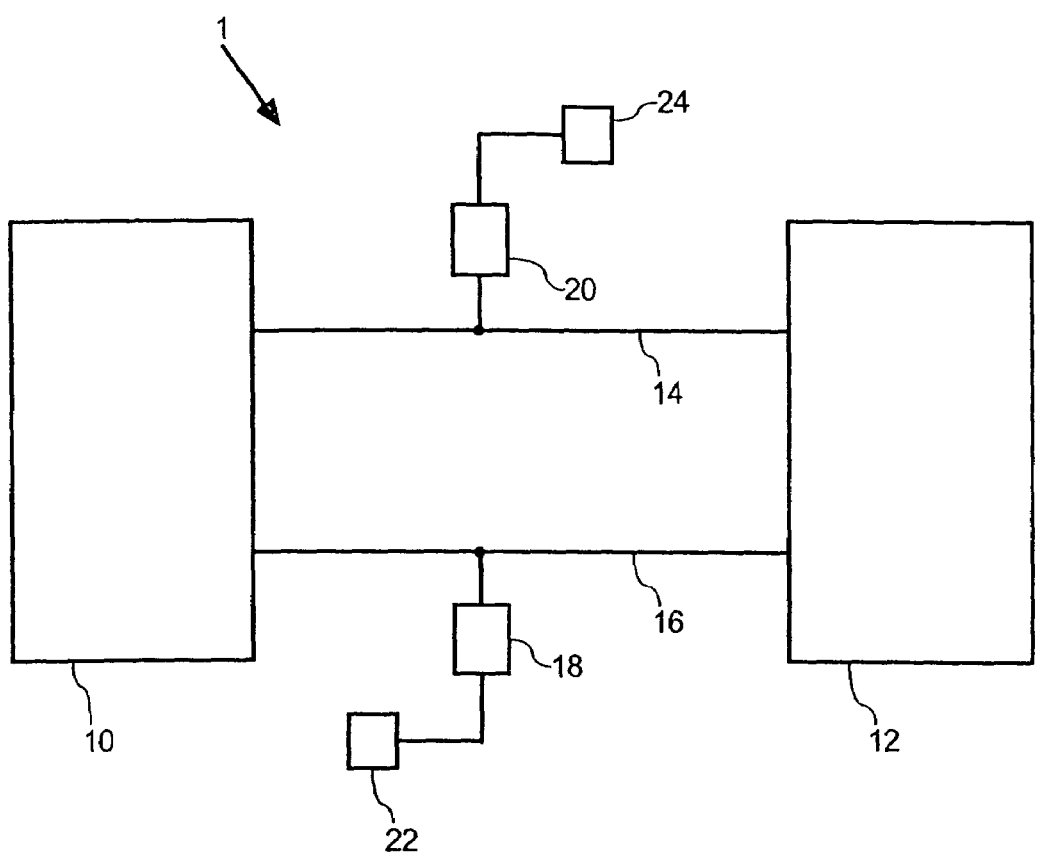
FIG. 1 illustrates a block diagram of the inventive coupling arrangement.

The coupling arrangement 1 has a first RF unit 10, a second RF unit 12, a first transmission line 16 and a second transmission line 14 connecting first and second RF units 10, 12. The coupling arrangement 1 further has a first coupling module 18 and a second coupling module 20 as well as a detector 22 and a termination element 24. The first coupling module 18 is coupled to the first transmission line 16 and the second coupling module 20 is connected to the second transmission line 14. Further, the first coupling module 18 is coupled to the detector 22 whereas the second coupling module 20 is further coupled to the termination element 24.

The first and second transmission lines 16, 14 serve to transmit a differential RF signal between first and second RF unit 10, 12. Preferably, the differential RF signal is decomposed into a first RF signal being transmitted by means of the first transmission line 16 and a second RF signal that is transmitted by means of the second transmission line 14.

Data being transmitted by means of the differential RF signal can be retrieved by means of an appropriate operation, such as e.g. mutually subtracting first and second RF signals provided by first and second transmission lines 14, 16.

In order to realize a space-saving implementation of the coupling arrangement, a first coupling module 18 comprising at least a capacitor is directly coupled to the first transmission line 16. Due to this direct coupling, the electrical, and in particular high frequency, properties of the coupling module 18 may have an impact on the transmission of the first RF signal. However, by means of the first coupling module 18 at least a part of the first RF signal may be effectively coupled out to the detector 22 that is connected to the first coupling module 18. Alternatively, the detector 22 might be incorporated into the coupling module 18. Coupling module 18 and detector 22 may inevitably have an impact on the signal transmission provided by the first transmission line 16.

In order to compensate an impact of the first coupling module 18 and the detector 22 on the first transmission line 16, a coupling module 20 and a termination element 24 are coupled to the second transmission line 14. Preferably, the coupling module 20 and the termination element 24 have the same combined electrical properties as coupling module 18 and detector 22. Consequently, coupling module 20 and termination element 24 have the same impact on the transmission of the second RF signal as coupling module's 18 and detector's 22 impact on the transmission of the first RF signal. In this way, first and second RF signals experience equal influence induced by respective coupling modules 18, 20.

The RF units 10, 12 might be implemented as arbitrary RF units, such as a modulator and a power amplifier. For example by realizing the first RF unit 10 as an IQ modulator and realizing second RF unit 12 as a power amplifier, the coupling arrangement 1 might be incorporated into a base station for a wireless cellular communication network.

The first coupling module 18 effectively provides the required coupling of the first RF signal to the detector 22 in order to measure the actual value of the first RF signal generated by the first RF unit 10. The second coupling module 20 provides comparable coupling of the second RF signal that is transmitted by means of the second transmission line 14. However, the second coupling module 20 serves to provide a second impact on the transmission of the second RF signal that substantially equals the impact of the coupling module 18 on the transmission of the first RF signal. Alternatively, instead of being coupled to a termination element 24, the second coupling module 20 might also be coupled to a detector for detecting and measuring the second RF signal in a separate way. In a typical embodiment of the inventive coupling arrangement, such an additional detector is generally superfluous. Anyhow, it might be useful for comparing first and second RF signals in order to control the decomposition of the differential RF signal into first and second RF signals.

The termination element 24 features a terminating impedance in order to effectively prevent development of interference in the transmission line 14 that might be due to reflections at the termination element 24.

Figure 2:
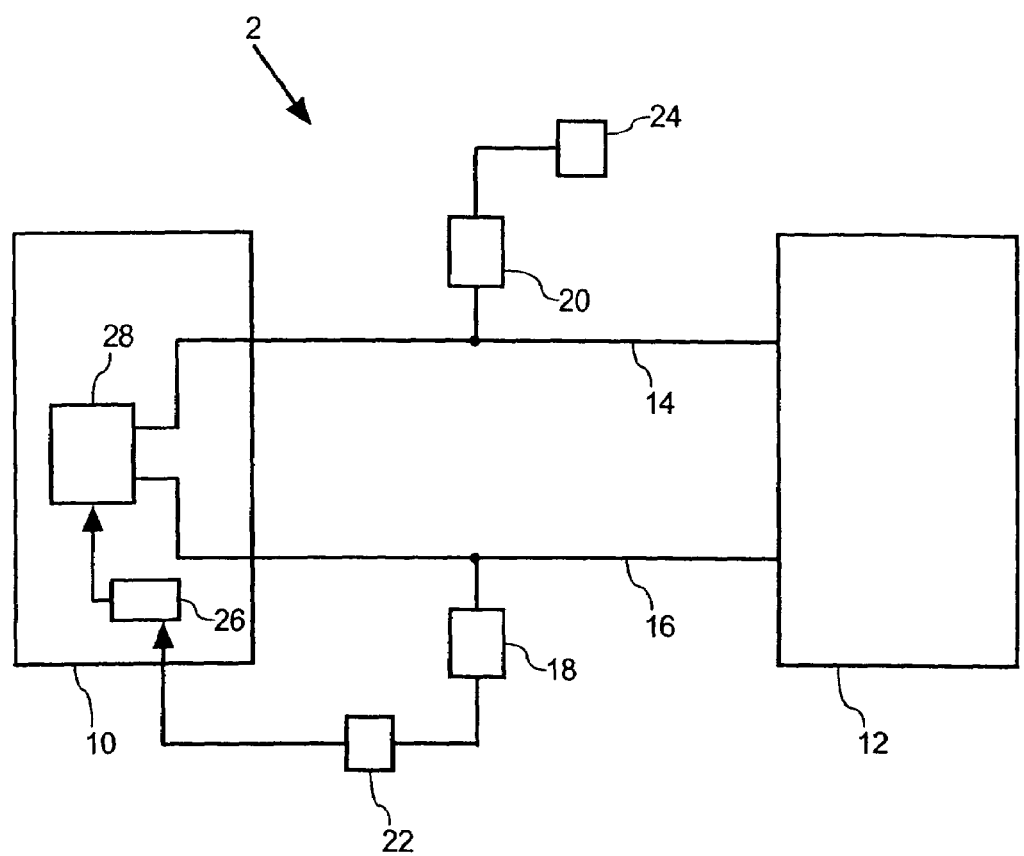
FIG. 2 illustrates an alternative embodiment of the inventive coupling arrangement.

FIG. 2 illustrates a block diagram of an alternative coupling arrangement providing a control loop for the first RF unit 10. Compared to the embodiment illustrated in FIG. 1 the first RF unit 10 features two additional components, namely a comparator 26 and a signal generator 28. The signal generator 28 is adapted to generate the first and the second RF signals that form the differential RF signal to be transmitted from the RF unit 10 to the RF unit 12. For example, the first RF unit 10 might be implemented as an IQ modulator.

The comparator 26 of the RF unit 10 is coupled to the detector 22 and serves to compare an actual value of the first RF signal with a desired value of the first RF signal. The comparator 26 is connected to the signal generator 28 of the RF unit 10 and provides an output signal that is indicative of deviations between actual and required value of a parameter of the first RF signal. Consequently, coupling module 18, detector 22, comparator 26 as well as signal generator 28 represent a feedback loop that is adapted to control an output of a modulator 10. Moreover, various parameters of the modulated signal being transmitted from the modulator 10 to the power amplifier 12 can be effectively analyzed for appropriately tuning the modulation.

In this way the inventive coupling arrangement provides first and second coupling means for symmetric coupling to a differential transmission line featuring first and second transmission lines. In this way impact of first coupling means on transmission of the first RF signal may be completely compensated by means of the second coupling means' impact on the respective second RF signal. In this way both coupling means might be realized on the basis of capacitive and resistive electrical components allowing for a space-saving and cost-effective implementation of the coupling arrangement.

List of Reference Numerals

1 coupling arrangement
2 coupling arrangement
10 RF unit
12 RF unit
14 transmission line
16 transmission line
18 coupling module
20 coupling module
22 detector
24 termination element
26 comparator
28 signal generator

The invention claimed is:

1. A base station for a wireless cellular communication network, comprising:
  a first and a second radio frequency unit,
  a first transmission line for transmitting a first component of a differential signal from the first radio frequency unit to the second radio frequency unit,
  a second transmission line for transmitting a second component of a differential signal from the first radio frequency unit to the second radio frequency unit,
  first coupling means for coupling out a signal of the first transmission line, the first coupling means having first electrical properties having a first impact on the transmission of the first component, said first coupling means comprising a first coupling module coupled to a detector,
  second coupling means being adapted to be coupled to the second transmission line, second coupling means having second electrical properties having a second impact on the transmission of the second component, the first and second electrical properties being substantially equal such that the first impact and the second impact are substantially equal, characterized in that the second coupling means comprises a termination element and a second coupling module that couples a second coupled signal out of the second transmission line to the termination element, said termination element terminating the second coupled signal.

2. A method of coupling out a radio frequency signal of a first transmission line connecting a first and a second radio frequency unit by means of the first and a second transmission line, the first transmission line providing transmission of a first radio frequency signal and the second transmission line providing transmission of a second radio frequency signal, the first and the second radio frequency signals forming two differential components of one radio signal being transmitted between the first and the second radio frequency unit and coupling out the radio frequency signal of the first transmission line comprising the steps of:
  coupling of first coupling means to the first transmission line for coupling out the radio frequency signal of the first transmission line, first coupling means having first electrical properties having a first impact on the transmission of the first radio frequency signal, said first coupling means comprising a first coupling module coupled to a detector,
  coupling of second coupling means to the second transmission line, the second coupling means having second electrical properties having a second impact on the transmission of the second radio frequency signal, the first and second electrical properties being substantially equal such that the first impact and the second impact are substantially equal, characterized in that the second coupling means comprises a termination element and a second coupling module that couples a second coupled signal out of the second transmission line to the termination element, said termination element terminating the second coupled signal.

3. A coupling arrangement for coupling out a signal of a first transmission line connecting a first and a second radio frequency unit, the first radio frequency unit being connected to the second radio frequency unit by means of the first and a second transmission line, the first transmission line providing transmission of a first radio frequency signal, the second transmission line providing transmission of a second radio frequency signal and the first and second radio frequency signals forming two differential components of one radio signal being transmitted between the first and the second radio frequency unit, the coupling arrangement comprising:
  first coupling means being adapted to be coupled to the first transmission line for coupling out the signal of the first transmission line, the first coupling means having first electrical properties; having a first impact on transmission of the first radio frequency signal, said first coupling means comprising a first coupling module coupled to a detector,
  second coupling means being adapted to be coupled to the second transmission line, the second coupling means having second electrical properties, having a second impact on transmission of the second radio frequency signal, the second electrical properties are substantially equal to the first electrical properties such that the first impact and the second impact are substantially equal, characterized in that the second coupling means comprises a termination element and a second coupling module that couples a second coupled signal out of the second transmission line to the termination element, said termination element terminating the second coupled signal.

4. The coupling arrangement according to claim 3, wherein the first coupling means further comprise a signal processing element for processing of the signal being coupled out of the first transmission line.

5. The coupling arrangement according to claim 3, wherein the first coupling means comprise a first electrical capacity and a first electrical resistance.

6. The coupling arrangement according to claim 3, wherein the first radio frequency unit comprises an In-Phase Quadrature (IQ) modulator and wherein the second radio frequency unit comprises a radio frequency power amplifier.

7. The coupling arrangement according to claim 4, wherein the signal processing element comprising a radio frequency detector diode.

8. The coupling arrangement according to claim 4, wherein the signal processing element is coupled to the first radio frequency unit, the signal processing element being adapted to measure at least one actual signal parameter of the signal and being adapted to transmit the at least one signal parameter to the first radio frequency unit, the first radio frequency unit further comprising control means for eliminating a difference between a desired signal parameter and the at least one actual signal parameter.

* * * * *